Dec. 29, 1925.  W. D. MOORE ET AL  1,567,286

FLANGED PIPE AND METHOD OF PRODUCING

Filed Jan. 30, 1925

INVENTOR
WILLIAM D. MOORE
and DOUGLAS BEATTY
BY
J. Granville Meyers
ATTORNEY

Patented Dec. 29, 1925.

1,567,286

UNITED STATES PATENT OFFICE.

WILLIAM DAVIS MOORE AND DOUGLAS BEATTY, OF BIRMINGHAM, ALABAMA, ASSIGNORS TO AMERICAN CAST IRON PIPE COMPANY, OF BIRMINGHAM, ALABAMA, A CORPORATION OF GEORGIA.

FLANGED PIPE AND METHOD OF PRODUCING.

Application filed January 30, 1925. Serial No. 5,791.

*To all whom it may concern:*

Be it known that we, WILLIAM D. MOORE and DOUGLAS BEATTY, citizens of the United States, and residents of Birmingham, in the county of Jefferson and State of Alabama, have invented certain new and useful Improvements in Flanged Pipes and Methods of Producing, of which the following is a specification.

This invention is an improvement in flanged pipe and method of producing, and more specifically in methods of converting plain end pipe to flanged pipe.

In the cast-iron pipe industry, orders are often received for flanged pipe, of a length not in the stock, and for a quantity too small to warrant a special casting.

There may be however, an ample stock of plain end pipe of the diameter required, and in length a multiple of that ordered. Or there may be pipe of the dimensions required, but without flanges.

In either case, a simple method of adding flanges to suitable lengths of plain pipe would permit filling of such orders promptly and at a profit. Flanges of the size required might be cast at the time with but little trouble, or flanges suitable for pipe of various dimensions might be kept in stock.

An object of the present invention is the provision of such a method, by the practice of which, plain pipe of any selected size may be quickly converted into flanged pipe.

Another object is the provision of a method of assembling separately cast pipe lengths and flanges, into unitary flanged lengths, capable of withstanding the stresses to which such pipe is ordinarily subjected.

Another object is the provision of a method to connect the lengths and flanges through the intermediary of a jointing member, forming a true union with both pipe and flange.

Another object is the provision of a method wherein through selected variations in the temperature ranges of the several elements entering into the joint, a shrink fit is obtained between each element and that which it encircles.

With these and other objects in view, the invention consists in the several steps and the order of the steps as fully described hereinafter, and pointed out in the claims appended hereto, it being understood that changes within the scope of the claims may be resorted to without departing from the spirit of the invention.

Figure 1:
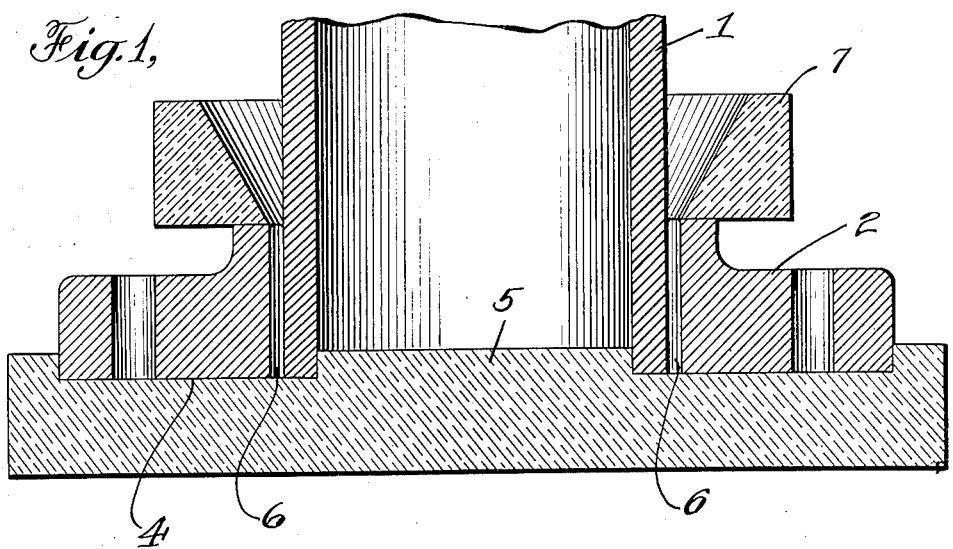
Fig. 1 is a vertical section through a pipe length and flange assembled for connection.
Figure 2:
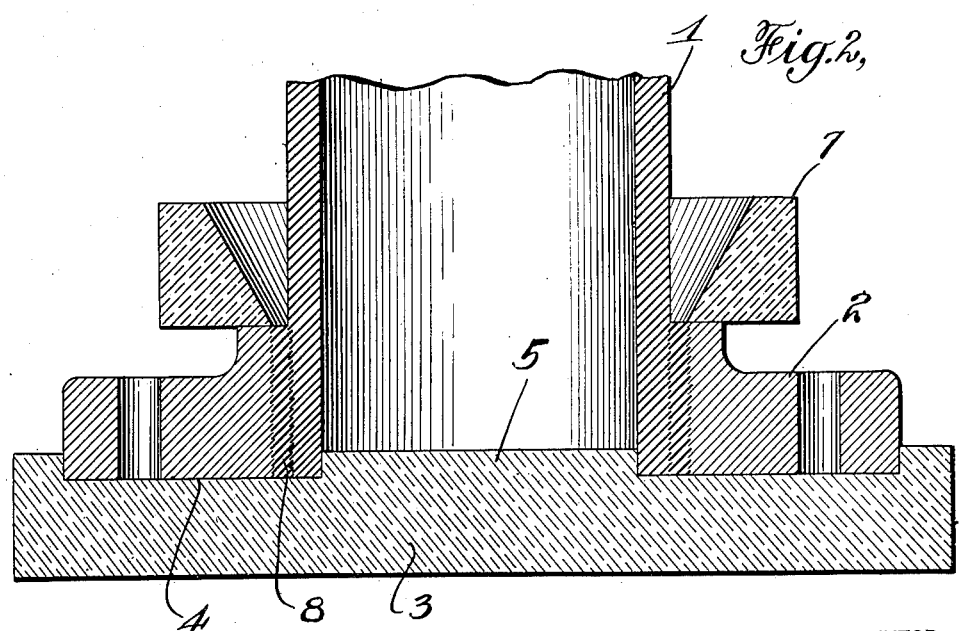
Fig. 2 is a similar view showing the connection completed.

In carrying out the present method, pipe lengths and flanges of suitable and corresponding dimensions are assembled in unitary arrangement, the flanges being permanently connected to the lengths.

When for instance an order is received at a foundry for flanged pipe of a length not in stock, plain pipe of the desired length is assembled in the manner shown in the drawings, wherein 1 indicates the pipe, and 2 the flange.

Prior to assembling, the two elements are heated to a degree such that no chilling of the molten metal, which is to form a bond between the elements, may occur, and preferably the flange is heated to a higher temperature than the pipe for a purpose to be presently set forth.

The flange and pipe should be co-axial, in order that the bonding material may have an equal thickness throughout, and for convenience in placing the bonding material, the pipe should be vertical, with the flange at the lower end thereof.

A convenient method of supporting the parts in a desired position as shown in the drawings, wherein the pipe is seated on a plate 3 of refractory material, the plate having an annular groove 4 with a circular boss 5 in the center, corresponding in diameter to the internal diameter of the pipe, and the pipe is seated about the boss, with the boss extending within the lower end of the pipe.

The peripheral wall of the groove 4 is a circle, having its center at the center of the boss, and having a diameter corresponding to the overall diameter of the flange, so that the flange will just seat within the groove. When the elements are so seated, with the pipe engaging the boss, and the peripheral edge of the flange abutting the peripheral wall of the groove, the said elements will be co-axial, and since the internal diameter of the flange is greater than the overall diameter of the pipe, there will be an annular space 6 between the pipe and flange, and the said space will be of equal width throughout.

A pouring basin 7, of refractory material in the form of a ring or annulus is arranged about the pipe, resting upon the upper face of the flange. The inner wall of the basin inclines downwardly and inwardly as shown, the smallest cross section of the ring opening corresponding substantially to the internal opening of the flange.

The bonding agent indicated at 8, and which may be of any suitable metal having a lower fusing point than that of the material composing pipe and flange is poured into the basin, which directs the molten metal into the annular space 6. The pouring is continued until the space is filled as shown, and the parts are permitted to cool. The bottom of the groove 4 limits the downward movement of the agent, and when the parts cool, there is a true bond between pipe, bonding material and flange.

As previously stated, the elements 1 and 2 of the joint are heated to a temperature short of fusing, but high enough such that no chilling of the bonding agent occurs. A suitable temperature for the metal of which such pipe and flanges are usually formed is, for the pipe from 900 degrees F. to 1200 degrees F., and for the flange from 1200 degrees F. to 1500 degrees F.

It will be understood however, that the temperature ranges depend upon conditions, as for instance the character of the metal from which the pipes and flanges are made. However, the temperature of the flange is raised to a higher degree than that of the pipe for a particular purpose. That is, to insure a shrink fit of each part or element of the joint upon that which it encircles. When cooling takes place, the flange member contracts to a greater degree than the pipe member and there is thus formed a true bond between all the elements of the joint. Any suitable bonding agent may be used, as for instance bronze, brass, copper, or any suitable metal having a suitable fusing point. The heating of the pipe and flange facilitates the running of the bonding material into spaces of narrow dimensions, which is an element of importance, since the bonding material is relatively expensive.

We claim:

1. The step in the method of connecting a cast flange to a cast pipe length through the intermediary of a fused metal which consists in heating the flange and pipe to a temperature approximately that of the fused metal, and with the temperature of the flange higher than that of the pipe lengths prior to the insertion of the fused metal, whereby the parts will be shrunk upon each other.

2. The method of connecting concentric members of relative size such that one fits within the other, with the members normally out of contact, which consists in heating the members to selected temperature, arranging the members co-axially, and inserting a fused bonding material between the adjacent faces thereof, whereby when the members cool, each will be shrunk upon the other.

3. The method of connecting concentric members of relative size such that one fits within the other, with the members normally out of contact, which consists in heating the members to selected temperatures, with that of the outer member higher than that of the inner member, arranging the members co-axially, and inserting a fused bonding material between the adjacent faces thereof, whereby when the members cool, each will be shrunk upon the other.

4. The method of attaching flanges to pipe lengths with a fusible bond, which comprises centering a pipe length heated to a temperature of about 900 to 1200 degrees F, with a flange having an internal diameter slightly greater than the external diameter of the pipe, and heated to a temperature of about 1200 to 1500 degrees F, and pouring between the pipe and flange a molten bonding metal having a fusing point lower than that of the pipe.

5. As an article of manufacture, a shrunk fit assemblage of co-axial annular members connected by an interposed bonding layer with a relatively low fusing point fused to both members.

Signed at Birmingham in the county of Jefferson and State of Alabama this 6th day of January A. D. 1925.

WILLIAM DAVIS MOORE.
DOUGLAS BEATTY.